Nov. 26, 1946.  R. J. PARSONS  2,411,834
DAMPER CONTROL
Filed July 15, 1944  3 Sheets-Sheet 1
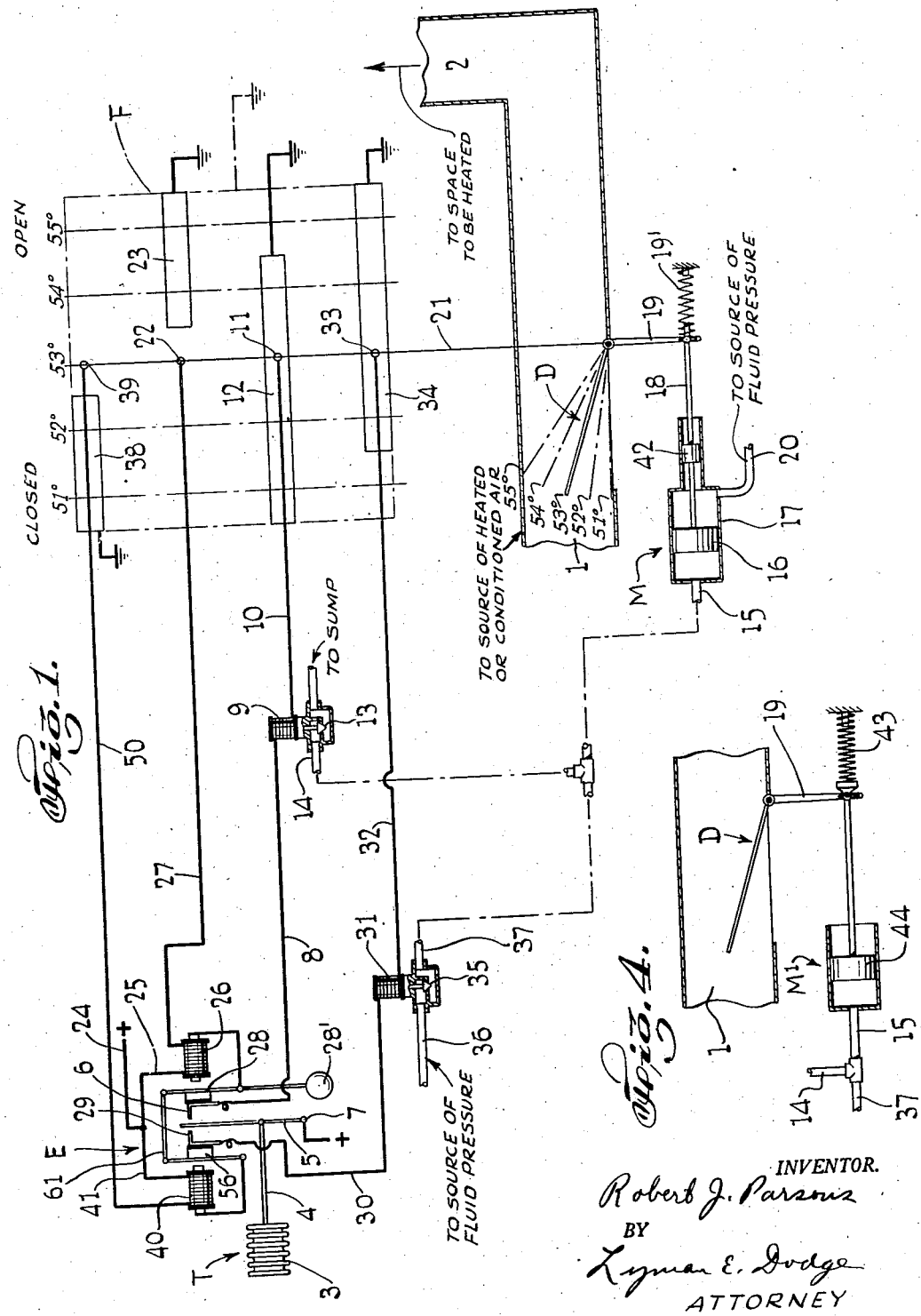
INVENTOR.
Robert J. Parsons
BY
Lyman E. Dodge
ATTORNEY Nov. 26, 1946.                R. J. PARSONS                2,411,834
                              DAMPER CONTROL
                           Filed July 15, 1944            3 Sheets-Sheet 2
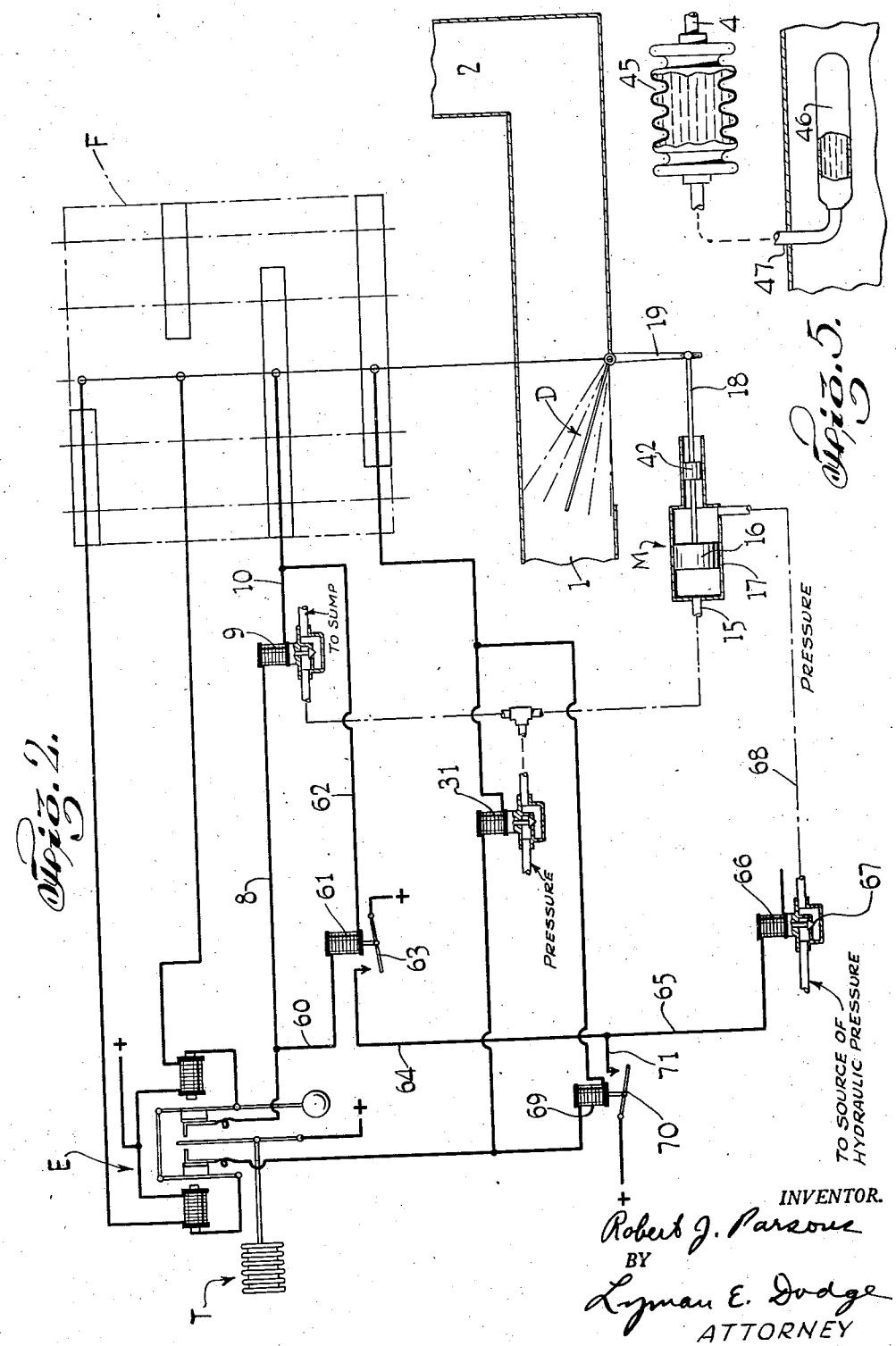
INVENTOR.
Robert J. Parsons
BY
Lyman E. Dodge
ATTORNEY

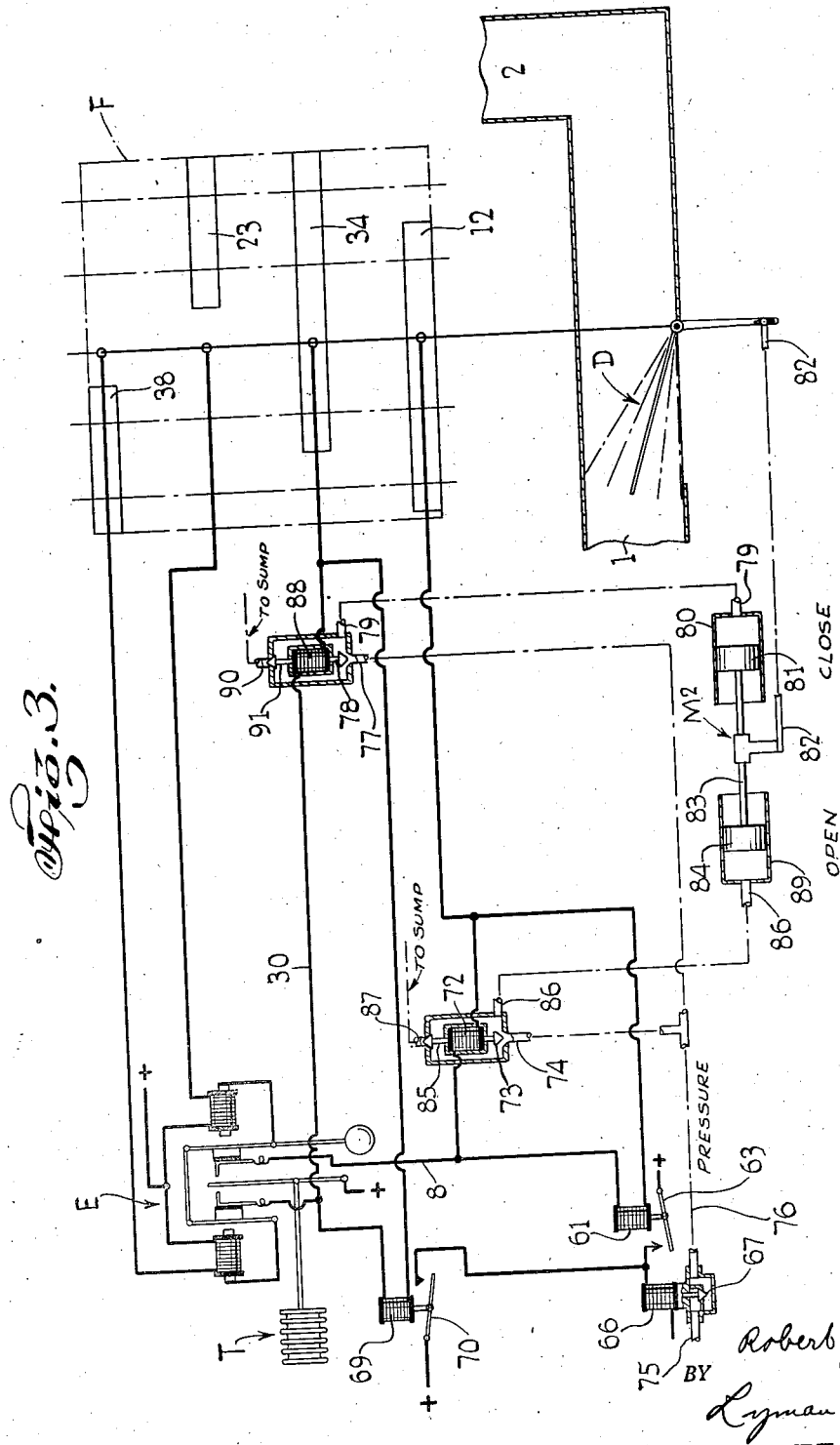

Patented Nov. 26, 1946

2,411,834

UNITED STATES PATENT OFFICE 2,411,834

DAMPER CONTROL

Robert J. Parsons, Schenectady, N. Y., assignor to Consolidated Car Heating Company, Inc., Albany, N. Y., a corporation of New York Application July 15, 1944, Serial No. 545,039

3 Claims. (Cl. 236—84)

1

This invention relates to heating and ventilating, particularly the heating and ventilating of a vehicle such as a bus or street car.

A principal object of this invention is the provision of a construction and arrangement whereby heated or conditioned air flowing in a conduit to a space to be heated and/or ventilated may be diverted to a by-pass more or less, by a valve or damper which may be regulated to various positions.

Other objects and advantages will appear as the description of the particular physical embodiment selected to illustrate the invention progresses and the novel features will be particularly pointed out in the appended claims.

In describing the particular physical embodiment selected to illustrate the invention, reference will be had to the accompanying drawing, and the several views thereon, in which like characters of reference designate like parts throughout the several views, and in which:

Figure 1 is a schematic or diagrammatic view illustrating circuits controlling and operating apparatus embodying my invention; Fig. 2 is a schematic or diagrammatic view illustrating the same parts as are shown in Fig. 1, and, in addition, means for shutting off hydraulic pressure from an operating motor when that motor is not being called upon to operate; Fig. 3 is a schematic or diagrammatic view of an arrangement embodying my invention illustrating the use of a hydraulic motor differing from the ones shown in Figs. 1 and 2; Fig. 4 is a fragmentary view illustrating an arrangement of a hydraulic motor which may be used in connection with my invention; Fig. 5 illustrates an alternative method of controlling a bellows or Sylphon used with an operating means in connection with my invention.

By reference to Fig. 1, particularly, it will appear that a damper designated generally by D is operable by a motor designated generally by M which is controlled by an electro-magnetic device designated generally by E, which electrovice is in turn governed by a thermo-magnetic device is in turn governed by a thermostatic device T. The object of operating the damper D is to regulate the amount of heated air flowing to a space to be heated in accordance with the temperature of that space.

1 designates a duct connected to a source of heated air. 2 designates a duct connected to a space to be heated by which thermostat T is governed. The regulation of the amount of heated air passing to the space to be heated is governed by the position of damper D.

2

All of the parts are shown in Fig. 1 as they would be if placed in a mid-position. Under such conditions the bellows or Sylphon 3 would, by means of link 4, position pivoted circuit-closing arm 5 in a central position as shown, damper D would be in, what may be called, the 53° position, and armatures 28 and 56 would be in normal position, as shown, due to weight 28' and connection 61.

If the temperature in the space to be heated rises to 54°, thermostat 3 would move pivoted circuit-closing arm 5 to the right, as viewed in Fig. 1, and would cause its upper end to touch contact member 6. When this occurs a circuit will be formed as follows: positive terminal of a source to the pivot 7 of pivot circuit-controlling member 5, contact 6, wire 8, solenoid coil 9, wire 10, brush 11, drum contact strip 12 and thence to ground or the other terminal of the source of electrical potential. Current flowing in the above traced path energizing the solenoid 9 would cause the valve 13 to be raised from its seat so that communication between a sump and pipe 14 and 15 is effected. When this connection is made piston 16 in cylinder 17 moves to the left, as viewed in Fig. 1, carrying with it piston rod 18 and so damper D, by means of lever arm 19, would be moved further toward the open position.

The reason piston 16 will move to the left under the condition stated, is because pipe 20 is in permanent connection with a source of fluid pressure, and when fluid contained in pipe 14 is allowed to escape from the left-hand side of piston 16, the fluid pressure from the source will move piston 16 to the left, as viewed in Fig. 1.

Valve 13 will be held opened until the drum F, moved synchronously with the damper D by member 21, reaches a position where brush 22 contacts drum strip 23, whereupon a circuit will be formed as follows: positive terminal of the source of electrical potential, wire 24, wire 25, electro-magnetic coil 26, wire 27, brush 22, drum contacting strip 23, and thence to ground or the other terminal of the source. Current flowing in the above traced path will energize electro-magnetic coil 26 and cause its pivoted armature 28, bearing contact 6, to move to the right, as viewed in Fig. 1, and away from pivoted circuit-closing arm 5 so that the circuit through solenoid 9 will be broken and the motor M will cease moving.

If, with the parts in the 54° position, the temperature should further rise in the space to be heated, pivoted circuit-closing arm 5 will again move further to the right, as viewed in Fig. 1, and again touch contact 6, whereupon a circuit will again be formed through solenoid 9 lifting valve 13 and causing motor M to move the damper toward the 55° position from the 54° position, that is to the full opened position. When drum F is turned so that brush 11 will no longer contact conducting strip 12, solenoid 9 will become deenergized and the valve 13 will close and the motor will stop.

If the temperature in the space to be heated now falls, so that pivoted circuit-closing arm 5 moves out of contact with contact 6, no change will take place in the setting of damper D, that is, if pivoted circuit-closing arm 5 moves to the 54° position.

If pivoted circuit-closing arm moves to the 53° position, it will touch contact 29 and a circuit will be formed as follows: positive terminal of the source of electrical potential, pivot 7, pivoted circuit-closing arm 5, contact 29, wire 30, solenoid 31, wire 32, brush 33, drum conducting strip 34 and to the negative terminal of the source or to ground. Current flowing in the above traced path will energize solenoid 31 and cause it to raise valve 35 from its seat and so allow fluid pressure to flow from pipe 36 through the valve 35 to pipes 37 and 15, and so to the cylinder 17, thus furnishing pressure to move piston 16 to the right, as viewed in Fig. 1. This would move piston rod 18, and so damper D, toward the closed position from the 55° position and it would continue its movement until the drum F turned to such an extent that drum conducting strip 23, is no longer under brush 22 which would be just before the 53° position. If the temperature in the space to be heated further drops to 52°, pivoted circuit-closing arm 5 will again touch contact 29 and again the motor M will be operated to move the damper toward the 52° position. The movement of the damper to the 52° position will also move the drum F and so conducting strip 38 will come under brush 39. When this occurs, a circuit is formed, as follows: positive terminal of a source of electrical potential, wire 24, wire 41, electromagnetic coil 40, wire 50, brush 39, conducting strip 38, and to ground or the other terminal of the source. Current flowing in the above traced path would energize electro-magnetic coil 40 and so cause its pivoted armature 56 to move to the left, as viewed in Fig. 1, drawing contact 29 away from pivoted circuit-controlling arm 5, so that the circuit through the solenoid 31 would be broken, the valve 35 would seat and supply of fluid through to motor M would cease and the damper would be in the 52° position.

If the temperature of the space to be heated further dropped to 51°, the pivoted circuit-closing arm 5 would again touch contact 29 and a circuit would again be formed through solenoid 31, again unseating valve 35 and supplying fluid pressure to the motor M so that the damper would be moved to the full closed or 51° position. When that position is reached, the brush 33 will be out of contact with conducting strip 34 and so the circuit through solenoid 31 would be broken and valve 35 would seat preventing further motion of the motor M.

If after the damper has been placed in the 51° position, the temperature in the space to be heated should rise, the thermostat T through the link 4 would move pivoted circuit-closing arm 5, to the right, as viewed in Fig. 1. When the pivoted circuit-closing arm 5 reaches the 52° position, all parts would remain in the same position as they now are, but when it reaches the 53° position, a circuit would be formed through solenoid 9 just as hereinbefore described, and the damper would be moved from the 51° position to the 53° position.

It will be noted that the same hydraulic pressure exists on both sides of piston 16 when pressure is supplied to pipe 15. The piston 16 nevertheless moves to the right under such conditions because of the differential piston 42 which is also subjected to the same amount of fluid pressure, so that the fluid pressure being the same on both sides of 16, piston 42 moves the piston rod 18 to the right, as viewed in Fig. 1.

From the hereinbefore given description it will now be apparent that a means has been provided whereby a damper controlling a supply of heated air may be regulated to various conditions or positions according to the temperature of the space to be heated. If it is in the 55° position it may be moved from the 55° position to the 53° position and then to the 52° position and the 51° position. By this arrangement the damper is not continually fluctuating from one position to another. It requires a predetermined drop in the temperature of the space to be heated before any movement of the damper takes place, but after it has once taken place, then a further slight change in the damper may be caused by a further fluctuation in the temperature. In the same way, after the damper has been placed in the 51° position, it requires a predetermined rise in the temperature of the space to be heated, that is to 53°, before any movement of the damper to the open position takes place, but after it has been placed in the 53° position, if the temperature rises still more, it may be placed in the 54° position and then in the 55° position, completely cutting off the supply of fluid air to the space to be heated.

Instead of using a motor M with differential pistons as 16 and 42, I may use a motor M' having only one piston, as shown in Fig. 4. When hydraulic pressure is relieved in pipe 14, the compression spring 43 will force the piston 44 to the left, as viewed in the figure. When pressure is supplied by pipe 37, the piston 44 will be moved to the right, as viewed in Fig. 4.

Although it may be convenient at times to have the thermostatic bellows T directly in the space to be heated, nevertheless, it may be more convenient to have a bellows or Sylphon, as shown in Fig. 5, and designated 45, which is not in the space to be heated, but which is connected to a closed body 46, in the space to be heated. In such case, a connection would be made between the closed body 46 and the bellows 45 by a capillary tube 47 so that the liquid in closed body 46 upon being subjected to a change of temperature would expand or contract, and, passing through the capillary tube 47 would communicate this volumetric change to the bellows 45 and so cause the bellows to operate the link 4.

Although I have described brush or finger 11 as breaking contact with 12 at the 55° and brush or finger 33 as breaking contact with 34 at the 51° position, this is not necessary. If the fingers 11 and 33 are allowed to remain in contact with 12 and 34 respectively at the positions stated, opportunity for damper D to drift toward closed position would be obviated as valve 13 would be kept open, and so pressure from a leakage at 35 would not build up pressure to move 16 to the right, as shown in Fig. 1 and somewhat move D toward closed position.

I have shown a spring 19' pressing 19 to the left, as shown in Fig. 1. If the hydraulic system fails, spring 19' will tend to open the damper and thereby prevent overheating of the space to be heated.

In Fig. 2 I have shown all of the parts as shown in Fig. 1, but, in addition, I have shown means whereby the hydraulic pressure will not be constantly on the pistons of the hydraulic motor M.

A branch wire is taken from wire 8, designated 60 which is connected to a solenoid 61 and then by wire 62 to wire 10 so that the solenoid 61 is in shunt to the solenoid 9. When the damper D is to be opened, in accordance with the description, as given particularly in connection with Figure 1, the solenoid 9 is energized. At the same time the solenoid 61 is energized and it also becomes deenergized at the same time solenoid 9 becomes deenergized. When solenoid 61 is energized, current flows in a circuit as follows: positive terminal of a source, armature 63 in the upper position, wire 64, wire 65, solenoid 66 and to the negative terminal of the source or ground. Current flowing in the above traced path energizes solenoid 66 which raises valve 67 from its seat and so allows hydraulic pressure to pass through pipe 68 to the cylinder 17 of motor M, so that the piston 16 is moved to the left, as viewed in Fig. 2. When solenoid 9 becomes deenergized, solenoid 61 becomes deenergized and also solenoid 66, so that, valve 67 seats and pressure is no longer supplied to pipe 68.

When solenoid 31 is energized solenoid 69 is also energized as it is in shunt to solenoid 31. When solenoid 69 is energized a circuit is formed in which current flows as follows: positive terminal of a source, armature 70, wire 71, wire 65, solenoid 66 and to the negative terminal of the source. Current flowing in the above traced path energizes solenoid 66 so that both solenoid 31 and solenoid 66 are simultaneously energized and the valves controlled by those solenoids are both off their seats. Under such conditions the same pressure is applied to both sides of the larger piston 16 so that it would have no tendency to move in either direction. The differential or smaller piston 42, however would determine the action, and by reason of that piston the piston rod 18 would move to the right, as viewed in Fig. 2, and move the damper D toward the closed position.

From the hereinbefore given description, it will be seen that by the alternative arrangement, hydraulic pressure is not continually supplied to the motor M and so any difficulties which might arise from a continual supply of hydraulic pressure to that motor, are avoided.

By Fig. 3 I have illustrated another arrangement which embodies my fundamental arrangement, as shown in Fig. 1 insofar as circuits are concerned, and also embodies the arrangements of circuits and solenoids as illustrated by Fig. 2, but my motor M² is of a different type.

In the arrangement of Fig. 3, the opening circuit is formed through the wire 8 which energizes solenoid 72 through the conducting strip 12 on the drum. At the same time the solenoid 72 is energized, the solenoid 61 is energized and with its armature 63 in the upper position, solenoid 66 is energized. When such conditions prevail valve 67 is raised from its seat and valve 73 is seated to close pipe 74. Under such conditions hydraulic pressure travels from pipe 75 past valve 67 and through pipes 76 and 77 past valve 78 in the upper position, and thence through pipe 79 to cylinder 80. The hydraulic pressure applied to cylinder 80 will move the piston 81 to the left, as viewed in Fig. 3, and so link 82 to the left, moving damper D toward the open position. It will be noted that piston rod 83 rigidly connects both the pistons 81 and 84. Piston 84 may be moved to the left, as viewed in Fig. 3, by the pressure applied to piston 81, because when solenoid 72 is energized valve 85 is moved from its seat and valve 73 is seated so that oil behind piston 84 is relieved through pipes 86 and 87 to the sump.

When a closing movement is desired, the closing circuit, just as in Fig. 1, is closed by wire 30, through solenoid 88, and conducting strip 34. When solenoid 88 is energized, solenoid 69 is also energized and this armature 70 is in the upper position so that a circuit is formed through solenoid 66. Under such conditions fluid pressure will pass under opened valve 67 through pipes 76 and 74, past valve 73 in the open position, and then by pipe 86 to cylinder 89. This hydraulic pressure will move piston 84 to the right, as viewed in Fig. 3. The pressure behind piston 81 will be relieved through pipes 79 and 90, valve 91 being in the opened position and valve 78 in the closed position.

Any suitable means may be used to retain valves 73 and 85 and 78 and 91 in their normal position as shown in Fig. 3. This may be, as is usual, springs or weights to hold all of the valves in the upper position as shown.

The electro-magnetic device E has been described as having its armatures 28 and 56 connected so as to move in unison, by the bar 61. This connection is not absolutely necessary. It may be dispensed with. In such case each armature would have a means to bring it to normal position such as weight 28'. In such case, just as explained in my copending application Serial No. 521,036 filed February 4, 1944, the damper would be moved from the 55° position to the 51° position and if the damper started at the 51° position it will be moved first to the 54° position and then to the 55° position.

Although I have particularly described one particular physical embodiment of my invention and modifications thereof, nevertheless, I desire to have it understood that the forms selected are merely illustrative, but do not exhaust the possible physical embodiments of the idea of means underlying my invention.

What I claim as new and desire to secure by Letters Patent of the United States, is:

1. A damper regulator, including, in combination: a source of fluid pressure; a differential piston motor including two different sized pistons connected to a common piston rod; the source of fluid pressure permanently connected to the motor between the pistons; a duct connected to a source of heated air and connected to a space to be heated; a damper in the duct connected to the motor piston and operable thereby; a thermostatic device in the space to be heated; a first means for relieving fluid pressure on one side of the larger of the differential pistons; a second means for applying fluid pressure on the same side and means controlled jointly by the thermostatic device and the motor for controlling said first and second named means.

2. A damper regulator, including, in combination: a duct provided with a by-pass, a movable damper positioned in said duct adapted to substantially close said by-pass when in one extreme position and to substantially close said duct when in an opposite extreme position; a cylinder having a larger bore and a smaller bore; a larger piston in the larger bore and a smaller piston in the smaller bore; a single piston rod attached to both pistons and to the damper whereby the damper is oscillated by movement of the piston rod; a source of fluid pressure; a permanent connection between said source and said cylinders intermediate said pistons; a duct connected to said cylinder on the opposite side of said larger piston to that exposed to the permanent fluid pressure; a first means adapted to connect said duct to the source of fluid pressure to operate said piston rod to move the damper toward a position to close said by-pass; a second means adapted to connect said duct with a sump whereby said piston rod moves the damper toward a position to close the duct; a commutator, including stationary brushes and conducting strips thereon connected to and movable synchronously with the damper; a source of potential; an electro-magnetic device; a thermostatic device; a pivoted circuit closing lever controlled by the thermostatic device and a circuit network connecting the first means, the second means, the commutator and brushes, the electro-magnetic device, the pivoted circuit closing lever and the source whereby the motor is operated and the damper moved by steps toward and to the position closing the by-pass and by steps toward and to the position closing the duct in accordance with the temperatures to which the thermostatic device is exposed.

3. A damper regulator, including, in combination: a larger cylinder and a smaller cylinder, a larger piston in the larger cylinder and a smaller piston in the smaller cylinder; a single piston rod connected to each piston; a source of fluid pressure permanently connected to the cylinders between said pistons; a duct connected to a source of heated air and leading to a space to be heated, said duct having a by-pass; a damper in said duct closing said by-pass in one extreme position and closing said duct in the other extreme position, said damper connected to said piston to be operated thereby; a thermostatic device in said space to be heated and means controlled jointly by said thermostatic device and said piston rod for applying fluid-pressure to said pistons and relieving fluid pressure thereon whereby the piston is reciprocated and the damper is oscillated.

ROBERT J. PARSONS.